United States Patent [19]
Brinkley et al.

[11] 3,947,308
[45] Mar. 30, 1976

[54] TIRE BUILDING MACHINE

[75] Inventors: Max D. Brinkley, North Canton; Robert I. Griffiths, Akron, both of Ohio

[73] Assignee: The Goodyear Tire & Rubber Company, Akron, Ohio

[22] Filed: Oct. 30, 1974

[21] Appl. No.: 519,367

Related U.S. Application Data

[62] Division of Ser. No. 323,030, Jan. 12, 1973, Pat. No. 3,867,228.

[52] U.S. Cl.............................. 156/133; 156/405
[51] Int. Cl.[2].................... B29H 17/02; B29H 17/20
[58] Field of Search ........... 156/126, 133, 405, 406, 156/123

[56] References Cited
UNITED STATES PATENTS

| | | | |
|---|---|---|---|
| 506,536 | 10/1893 | O'Bryan............................. | 270/31 |
| 1,714,799 | 5/1929 | Midgley........................ | 156/132 X |
| 2,936,813 | 5/1960 | Haase ................................ | 156/126 |
| 3,143,449 | 8/1964 | Bosumworth et al............. | 156/126 |
| 3,192,094 | 6/1965 | Phillips et al. ..................... | 156/353 |
| 3,332,820 | 7/1967 | Porter................................ | 156/126 X |
| 3,867,228 | 2/1975 | Brinkley............................ | 156/405 |

FOREIGN PATENTS OR APPLICATIONS

| | | | |
|---|---|---|---|
| 231,994 | 1/1959 | United Kingdom................. | 156/133 |

*Primary Examiner*—William A. Powell
*Assistant Examiner*—John E. Kittle
*Attorney, Agent, or Firm*—F. W. Brunner; R. S. Washburn

[57] ABSTRACT

Method and apparatus for building a giant tire and particularly for building one or more endless bands of suitable ply stock and for transferring such bands from the band building means to a carcass building drum after which transfer the remaining construction of the tire can be accomplished conventionally. The apparatus includes a wide, flat, endless belt, the surface of which functions as a splicing table whereon successive panels of ply stock are joined edge-to-edge to form a ply and also as means for transferring the so-formed ply directly into wrapping relation with a band building surface whereon such ply is made endless to form a tire ply band. A bridge spanning the width of the belt, at successive selected angles transverse to the direction of movement of the belt, supports at least one ply stock pay-off means from which successive discrete panels of suitable ply stock are disposed on the surface of the belt. The band building means is provided by a generally cylindrical drum the circumference of which is adjustable. Alternative systems of cooperation between the carcass building drum and the band building drum are also set forth.

6 Claims, 5 Drawing Figures

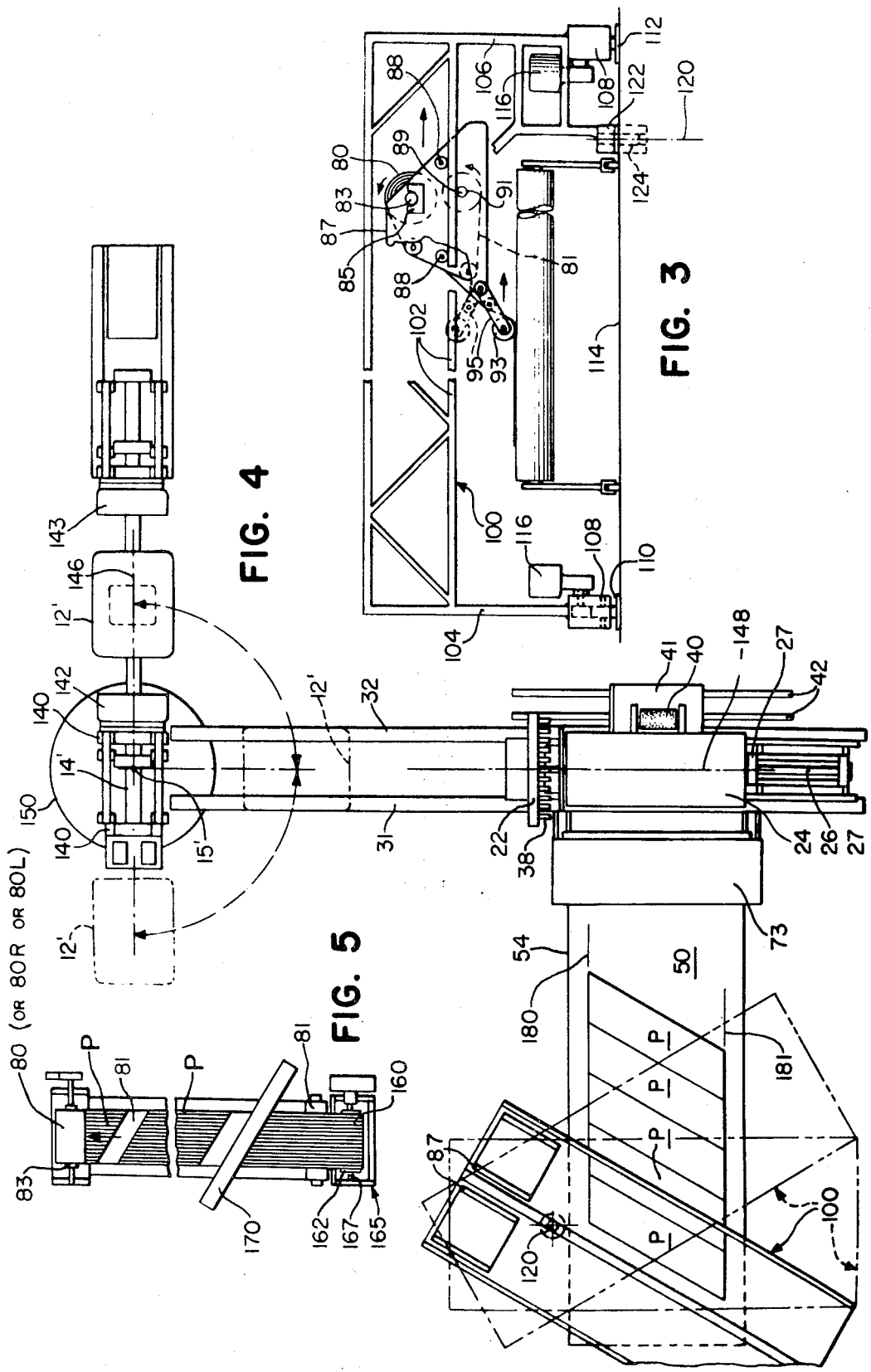

TIRE BUILDING MACHINE

This is a division of application Ser. No. 323,030 filed Jan. 12, 1973, now U.S. Pat. No. 3,867,228.

The foregoing abstract is not to be taken as limiting the invention of this application, and in order to understand the full nature and extent of the technical disclosure of this application, reference must be made to the accompanying drawing and the following detailed description.

BACKGROUND OF THE INVENTION

The building of giant tires is entirely different from building the ordinary and relatively more familiar tires used on vehicles which travel over paved highways or streets. The term "giant tire" as used in the present specification means not only tires of great size but also of constructions adapted for use on off-the-road equipment such as earthmovers, and the like. By way of illustration, the apparatus about to be described is adapted to construct tires having bead diameters from 39 inches to 69 inches and in which the band width measured from edge to edge of the ply from which the band is formed may be as much as 220 inches and the circumference of the band before the same is expanded into its final tire shape, may range from 164 inches to 290 inches. While earthmover tires approaching such size have previously been built, the successive plies have been built conventionally either directly upon a carcass-forming drum or on the rotatable surface of a band builder. In both cases, each successive portion of ply stock was required to be positioned by hand and spliced by hand. These operations required not only great physical effort by the tire builder, but made the accurate repetition of successive operations extremely difficult.

SUMMARY OF THE INVENTION

A principal object of the invention is to provide for building giant tires more efficiently than heretofore, with less human effort and time expended and with repeatable precision in the placement of components of the tire, particularly of the ply or plies forming the carcass.

The foregoing and other objects, which will be made apparent subsequently herein, are accomplished in accordance with the invention by a method comprising cutting a plurality of successive discrete panels of predetermined length from a running length of ply stock having a multiplicity of reinforcement cord elements extending therein parallel to each said length and spacing said panels apart end to end. A core beam having a supply of such panels wound thereon is translated in a direction parallel to the cord elements repeatedly forward and back across the horizontal top reach of an endless belt while transferring from said supply to said reach of belt one of said panels in successive passes of the beam forwardly across the belt, moving the reach of the belt forward toward band building means a distance proportional to the width of said panels as each such pass is completed and joining a longitudinal edge of each successive panel to the adjacent longitudinal edge of the next preceding panel when the same have been successively transferred to the reach of belt, so as to form an integral predetermined length tire ply, then juxtaposing said belt and tire band building means and rotating both said belt and said means at like surface speeds to transfer said ply from the reach of belt to said means and to wind about the latter to be formed as an endless tire band thereon, and thereafter transferring the so-built band from said band building means to a tire building drum and effecting completion of the tire.

In order to carry out the aforesaid method, a new combination of apparatus includes band building means such as a rotatable band building drum having a surface adjustable in its circumferential length, an endless belt with a horizontal top surface for receiving thereon precut panels of ply stock and having means for moving the same toward said drum, a bridge spanning said belt, and at least one stock let-off truck mounted on said bridge for movement back and forth therealong in selected directions transversely of the direction of movement of said belt.

To acquaint those skilled in the arts most nearly related to the invention claimed herein, a preferred embodiment and mode for putting the same into practice, are described below making reference to the attached drawings in which:

FIG. 3 is a partial elevation view of a portion of the apparatus as seen from the line 3—3 of FIG. 1;

FIG. 4 is a plan view of apparatus according to the invention differing somewhat in arrangement from that shown in FIG. 1; and FIG. 5 is a schematic plan view of a bias-cutting and rewinding apparatus for preparing tire ply stock for use in the apparatus of FIG. 1 or that of FIG. 4.

A PREFERRED EMBODIMENT

Figures 1, 2:
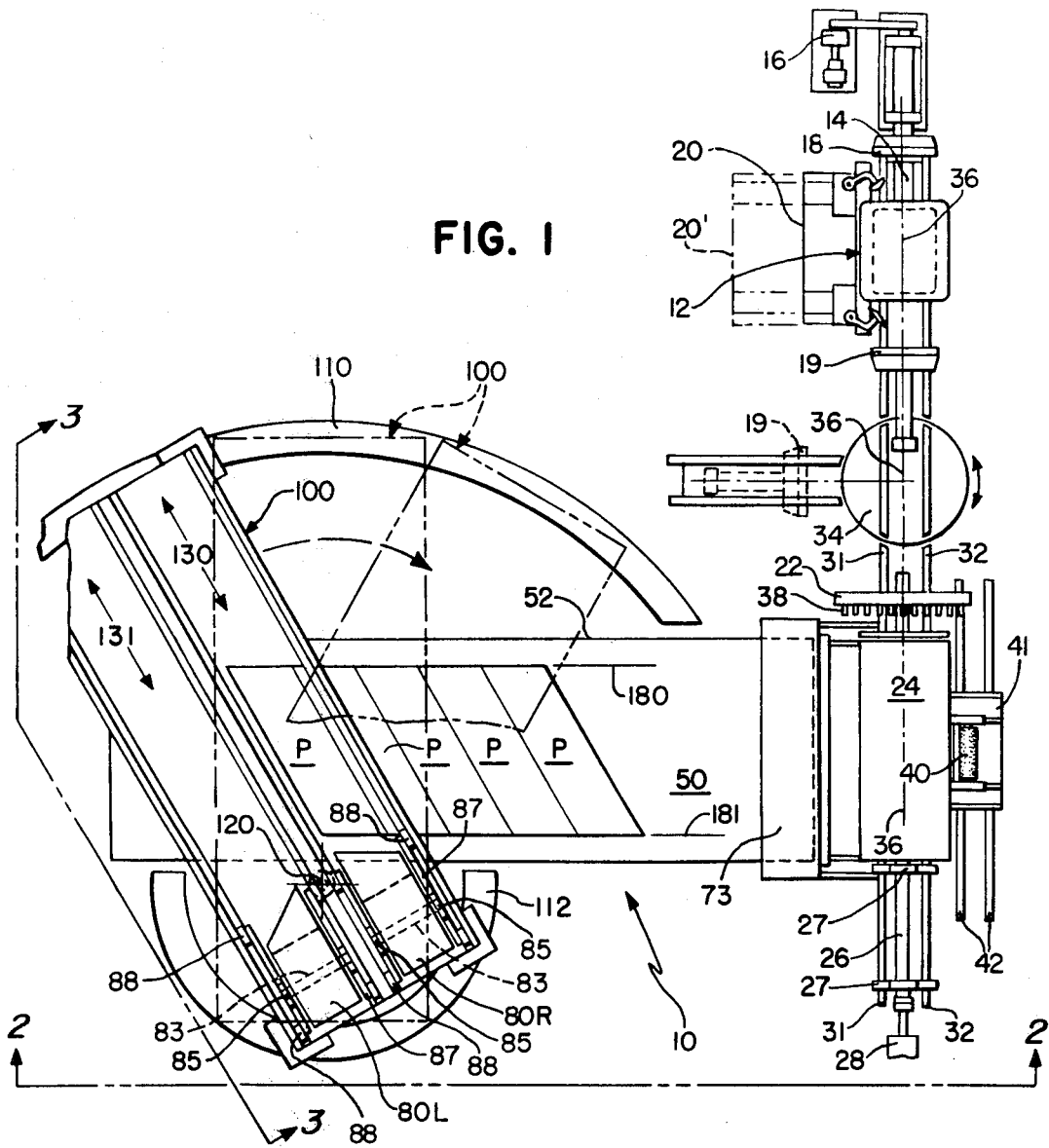
FIG. 1 is a schematic plan view of apparatus in accordance with the invention.
FIG. 2 is an elevation view of the apparatus as seen from line 2—2 of FIG. 1.

In accordance with the present invention, ply stock having a prescribed multiplicity of reinforcement cord elements covered with non-cured gum or rubber compound, is received in large rolls. Such rolls contain, for example, several hundred yards of ply stock of suitable width. The reinforcement elements therein can be of any known material suitable for reinforcement of such giant tires. The term, cord elements, herein will be understood to mean any filamentary material assembled in yarn, strand, cord or cable. Commonly, the reinforcing cord elements are metallic cable with all such cables extending parallel to the running length of the ply stock.

In the method according to the invention, such ply stock is cut transversely of its running length to form a plurality of successive panels each of predetermined length. The ply stock is received interwound on the roll together with a separating liner of cloth or the equivalent. This first liner is separated from the ply stock immediately prior to its entry into the region of a cut-off means and such ply stock immediately is taken onto the surface of a second separating liner which extends in directional alignment with the first liner so that the cord elements of the ply stock are in no way changed in their direction of parallel alignment. After each successive panel has been cut from the running length of ply stock, it is wound, together with the second liner, about a core beam to form a precisely wound roll. A sufficient number of panels are interwound with the second liner on the roll so that the roll will weigh in excess of 1000 pounds. The individual panels so cut preferably are spaced apart end to end on the second liner for purposes which will be made more plain presently.

In order to join successive panels one to another to form a ply of length sufficient to encompass the band building means, the roll on the beam is translated in a direction, normal to its own axis, across a splicing table provided by the flat and preferably horizontal reach of an endless belt. The direction of travel of the roll is at a predetermined angle with respect to the direction of travel of the endless belt. During a pass of the roll across the belt, the second liner is unwound sufficiently for one of the precut panels to be transferred from the liner to the splicing table. After the roll has made a complete pass across the table, the endless belt is advanced a distance commensurate with the width (in the direction of belt movement) of the ply stock panel while the roll is being returned to its starting position. The roll is again traversed across the belt while a second panel is transferred from the liner onto the splicing table as before. The advance of the endless belt is sufficient to permit a predetermined amount of overlap of the second panel with respect to the first so that the two panels can be suitably spliced. In like manner, succeeding panels are laid down on the splicing table until there are accumulated on the splicing table a sufficient number of panels to completely encompass the band building means.

It is also contemplated within the scope of the invention that the successive panels can be cut from an uncut running length of ply stock carried in a supply roll wound about such core beam. The supply roll and beam, in this modification, can be translated forward and back across the belt of the splicing table. As the ply stock is unwound during one pass across the belt, a predetermined length is measured and cut off from the running length on the supply roll to form a next discrete panel, while a former panel precut in like manner is being disposed on the surface of the belt.

It is a feature of the present invention that the same belt which serves as a splicing table also serves to transfer the ply from the endless splicing table directly to the band building means. To accomplish this, the splicing table endless belt is moved into juxtaposition with the surface of band building means such as a rigid surface drum. The circumferential surface of the band building drum and of the belt are then moved at like surface speeds. The ply is then transferred from the endless belt onto the band building means, being wrapped thereabout. The leading and trailing edges of the ply are then joined to form an endless tire band on the band building means.

Both the method and apparatus in accordance with the present invention contemplate building a tire having radial plies, in which the cord elements extend at least approximately parallel to the axis of the tire and, with equal facility, a bias-ply tire in which successive plies have cord elements oriented obliquely and oppositely with respect to a plane normal to the axis of the tire.

In the construction of a bias-ply tire, the sequence just described is repeated, changing only the angle of the travel of the roll relative to the belt and the orientation of the roll axis so that the winding liner is unwound from the roll in the rotational sense opposite to that employed in previously unwinding the roll. In a manner identical to that described above, the second ply having its cord elements disposed at equal but opposite angles with respect to the direction of movement of the belt is again wound about and spliced on the band building means.

It will be apparent that the tire ply band made as thus described will have been constructed with a minimum of physical effort and that accurate repeatability can be attained more readily than possible in heretofore practiced methods.

Referring to the drawings and particularly to FIGS. 1 and 2, the apparatus 10 in accordance with the invention, which apparatus is particularly adapted for the practice of the method hereinbefore described, includes a tire building drum 12 mounted conventionally upon a cantilevered shaft 14 having suitable drive means 16 connected to provide rotation of the drum. In association with the drum are conventional beadsetting mechanisms 18, 19, shown schematically, as well as a stitcher mechanism 20 of conventional design and function. The mechanism 20 can be moved away from the drum 12 to the remote position 20' to make space for the movement of the band transfer ring 22 presently to be described in greater detail.

Associated with the tire building drum 12 is a band building means here in the form of a generally cylindrical drum 24 having a metal surface, the circumference of which is adjustable in length both to provide increments of increase in circumference as successive bands are built and to facilitate removal of an already constructed band off the band building drum 24 to be incorporated in the tire. A band building drum particularly suitable for use in accordance with the present invention has been described in U.S. Pat. No. 3,654,026, issued Apr. 4, 1972, to Max D. Brinkley and Robert I. Griffiths.

The band building drum 24 is supported for rotation on a shaft 26 rotatably mounted in bearing housings 27 at one end and, like the tire building drum 12, is connected to its own drive means 28 for rotating the drum 24.

In order to facilitate the transfer of a completed band from the band building drum 24 onto the tire building drum 12, the bearing housings 27 are mounted on a track provided by the two rails 31, 32 on which the band building drum 24 can be moved coaxially toward and away from the tire building drum 12. The bead-setting and ply turnup mechanism 19 is also mounted to travel along the rails 31, 32 from its operating position as shown (FIG. 1) onto the turntable 34. After the turntable has been turned from its position as shown, the mechanism 19 is then moved off the turntable at right angles to the common axis 36 of the drum 12 and drum 24 so that the band building drum 24 can be brought into coaxial juxtaposition with the tire building drum 12 at which time the band pull-on ring 22 can be attached to the band by the circumferential array of clamps 38 and actuated to move the band coaxially and directly from the band building drum 24 to the tire building drum 12. Apparatus particularly adapted for transferring a band in the manner just described is disclosed in U.S. Pat. No. 2,936,813, issued May 17, 1960, to J. I. Haase.

To provide an uncured gum liner in the tire, a ply of uncured rubber compound is applied directly to the surface of the band building drum 24 to become an integral part of the first ply or plies which constitute the initial or first band of the tire. For this purpose, a gum stock leftoff 40 is mounted on the platform 41 for movement toward and away from the band building drum in a direction normal to the axis 36. The platform 41 is mounted for movement parallel to the axis 36 on a track 42 disposed in the floor adjacent the band building drum. Successive strips of liner gum stock more narrow than the face width of the drum 24 can be wound circumferentially onto the drum 24 from the letoff 40. The letoff 40 is placed in successive spaced locations along the drum so that the successive strips of liner gum stock are wrapped circumferentially about the drum. The plurality of narrow strips so wrapped are joined to form an integral liner ply of the full width required in the band and ultimate tire.

To construct a single integral ply length to be wrapped once about the band building drum 24 to form thereon an endless band or an endless element of a composite band of two or more superposed band layers, a plurality of panels P, of ply stock are assembled and joined edge to edge on a splicing table. The surface 50 of the table 52 is provided by an endless flat belt 54 trained about a forward 56 and a rear carrying roll 58 which are mounted rotatably about axes parallel to the axis 36 of the band building drum 24. The rolls 56, 58 are supported in suitable bearings mounted on a frame 60 extending generally normal to the drum axis 36 and supported on tracks 62 by a plurality of wheels 64 fixed on the frame. Drive means 66 are connected to drive the rear roll 58 to rotate the belt about rolls 56, 58, the intermediate supporting rolls (not shown), and the frame. Further drive means 68 are connected to the frame 60 to move the table 52 in a direction perpendicular to the axis 36 of the drum, from its position as shown in FIG. 2 to a forward position (shown in phantom outline) in which the forward end portion 70 of the frame 60 carrying the roll 56 and belt are disposed beneath the band building drum 24. The forward portion 70 of the frame is articulated as at 72 and is provided with elevating means 74 by which the forward portion 70 and the forward roll 56 with a portion of the belt 54 can be raised sufficiently to bring a ply disposed on the belt 54 into contact with the drum 24 or with a band already in place on the drum to initiate the transfer of the ply to the drum.

A first ply can be caused to wrap about the drum 24 by the tack, or well-known tendency of ply stock to adhere to the previously mentioned uncured gum of the carcass liner already on the drum. In initiating the wrapping of a subsequent ply or of a ply in the absence of such gum liner, the wrapping transfer of the ply from the belt 54 to the surface of the drum 24 is assisted by magnetic force. One or more magnetic devices 76 are removably attached to the surface of the drum 24 with the leading edge of the ply held between the devices and the drum surface by the magnetic force acting through the ply thickness.

To provide convenient access to the band on the drum 24, particularly to inspect or to perfect a splice of the respective ends of the ply to form the band, an operator's platform 73 spans the table 52 parallel the drum axis 36. The platform is mounted on wheels 75 enabling the platform to be moved close to the drum surface and away from the drum. Means, not shown, are provided to locate and to retain the platform fixedly in position relative to the drum 24 during building of a band thereon. Conventional stitching mechanism 77 operable to consolidate a band is mounted on the platform. Supply reels for dispensing additional tire band components, e.g. sidewall veneer, wedge strips, or the like, can also be mounted on the platform for the convenience of the builder.

To dispose each successive panel P of ply stock on the surface 50 of the belt 54 which forms the splicing table 52, a supply roll 80 (80R, 80L) comprising a separating liner 81 of cloth or equivalent is wound on a core beam 83. The beam is supported in suitable bearings 85 on a truck 87 having support wheels 88 by which the truck and roll are traversed longitudinally of bridge means spanning the belt. The truck 87 also provides a beam 89 carrying a shell 91 on which the liner 81 is rewound from the roll 80. Also mounted on the truck is a roll 93 which can function to form a splice joining successive panels one to another. The roll 93 is mounted on a parallel pair of swing arms 95 by which the roll is raised or lowered relative to the surface 50 of the splicing table 52.

The bridge means in the apparatus 10 comprises a horizontal bridge member 100 of open truss construction which carries tracks 102 on which the wheels of the truck 87 are supported. The truck 87 moves longitudinally of the bridge member 100 forward and back across the belt 54. The bridge member is supported above the table 52 by vertical legs 104, 106 spaced outwardly from the table 52. Each of the legs has a wheel or dolly 108 rollable on one of the arcuate tracks 110, 112 set on or in the floor 114. Each, in the apparatus 10, of the dollies 108 has drive means 116 mounted thereon which means cooperate to swing the bridge member to an appropriate angle with respect to the direction of movement of the belt 54 about a vertical axis 120 established by the pivot bearing fixture 122 attached to the legs 106 and the pivot stud 124 set in the floor. As will be apparent from the drawings, the bridge member 100 in the apparatus 10 provides two parallel side-by-side trackways 130, 131 to accommodate two trucks 87. A single track structure can suffice for building radial ply bands (wherein the cord elements extend parallel to the band and ultimate tire axis) but requires that the panels dispensed for building successive plies of opposite bias angles be disposed from a single roll one side up for one bias angle ply and the other side up for the opposite bias angle ply. The dual bridge structure of the apparatus 10 accommodates two trucks 87 and supply rolls 80R and 80L, which can be identical except for the orientation of the bias-cut ends of the respective panels dispensed from the rolls. It will be apparent, however, that either bias ply bands (wherein the cord elements of the respective plies make opposite, and usually equal, acute angles with a plane normal to the axis of the band and of the ultimate tire) or radial ply bands can be build by the apparatus 10.

In FIG. 4, there is illustrated an alternative arrangement of the tire building drum 12'. As before, the building drum is mounted upon a spindle 14' which is supported in bearing housings 140. Ply turning and beadsetting mechanisms 142, 143 are mounted coaxially of the drum 12' and the spindle. In the position illustrated, FIG. 4, where one or more bands are converted to form a tire carcass, the axis 146 of the tire building drum 12' is disposed normal to the axis 148 of the band building drum 24. The bearing housings 140 are mounted on a turret 150 having a pivotal axis 15' extending vertically at the intersection of the spindle axis 146 and the band building drum axis 148. To receive a band from the band building drum 24 on which it has been built, the tire building drum 12' is turned into coaxial alignment with the band building drum 24 in which position the transfer of the band is accomplished in the same manner as has been described on the apparatus of FIG. 1.

To prepare the roll 80 or rolls 80R, 80L containing the successive panels P of ply stock to be disposed on the belt 54, the successive panels are cut from a continuous running length of ply stock which has been prepared in the customary manner by calendering and wound in the roll 160 (FIG. 5) together with a first separating liner (not shown) of cloth or the equivalent on a core 162. This core is mounted in an unwind or letoff stand 165 in which the core is supported rotatably on a core bar 167 so that the stock can be unwound in a direction parallel to the running length of the cord elements in the ply. As the unwinding progresses, the first liner is rewound separately from the ply stock, which ply stock is then passed through the conventional bias-cutting mechanism 170 in which the running length of ply stock is cut transversely into a sequence of individual discrete ply panels P each of predetermined length between cut edges which edges will ultimately lie in planes perpendicular to the axis of the tire. The ply stock is transferred immediately before entering the cutting mechanism 170 to the second separating liner 81 by which the cut panels are moved away to separate the cut edge of the panel from the cut edge of the running length of ply stock extending from the roll 160 with the result that the cut panels are spaced end to end and not contiguous on the liner 81. The second liner 81 is moved continuously, winding the panels P therein on the roll 80 (or one of 80R, 80L). It may also be moved faster. The supply roll 160 and the uncut ply stock moves intermittently, being stopped as each cut is made. The panels P are thus spaced apart end-to-end a satisfactory distance. The second liner 81 and the panels P are wound onto a second roll 80 (80R, 80L) which will be transferred to the truck 87. Mention has been made earlier herein of the advantage obtained by this spacing of the panels P on the liner 81. It will be recalled that as the liner 81 is unwound from the roll 80 (80R, 80L) as the truck 87 is moved across the belt 54, one precut ply panel P is dispensed from the truck and positioned on the belt. The end-to-end spacing of the ply panels P enables the cut leading end of the panel to be disposed with manual assistance in precise alignment with the desired plane 180 which is the ply and band edge and with the cut ends of previous and succeeding panels on the belt as the truck 87 begins its forward movement. The spacing between the ends of successive panels P on the liner 81 permits an individual panel P to be laid down with its cut trailing end in alignment with the plane 181 defining the opposite edge of the band, and with the corresponding ends of the panels already disposed on the belt. The space intervening between the trailing cut edge of one ply panel and the leading cut edge of the next ply panel avoids prematurely trapping a next panel so that the truck 87 can be moved back to its starting position without damage to the leading edge of the next ply panel. To facilitate axial displacement or step-off of a second ply relative to a first ply wound about the drum 24 to form a band thereon, the housings 27 can be moved along the rails 31,32 a distance relative to the table 52 corresponding to the desired step-off after the application of such first ply and before the application of the second ply onto the drum 24.

While certain representative embodiments and details have been shown for the purpose of illustrating the invention, it will be apparent to those skilled in the art that various changes and modifications may be made therein without departing from the spirit or scope of the invention.

What is claimed is:

1. A method of building a giant tire comprising the steps of:
   cutting a plurality of successive panels of predetermined length from a running length of ply stock having a multiplicity of reinforcement cord elements extending therein parallel to said length;
   spacing said panels apart end to end on one surface of a running length of separating liner and winding said liner and said panels about a core beam while maintaining said elements parallel to said running length;
   passing said beam in a direction parallel to said cord elements repeatedly forward and back across the horizontal top reach of an endless belt while transferring from said liner to said reach one of said panels during successive passes in one direction across said belt;
   moving said reach foward toward band building means a distance which is a function of the width of said panel in the direction of such movement as such pass is completed and joining the longitudinal edge of each successive panel to the adjacent edge of the next preceding panel to form an integral single length of tire ply stock;
   juxtaposing said belt and tire band building means and then rotating said belt and said means at like surface speeds to transfer said ply from said reach of belt to said means and wind said ply about said means; and
   transferring the band from said band building means to a tire carcass building drum and thereafter effecting completion of the tire.

2. Method as claimed in claim 1, said joining being effected by superimposing a predetermined portion of a later so transferred one of said panels upon a corresponding portion of a next previously so transferred one of said panels.

3. Method as claimed in claim 1, said moving being effected in a first direction at an angle oblique to the direction of movement of said belt to form a first bias ply thereon and then, after wrapping said first ply about said band building means, repeating said moving in a second direction at an oblique angle opposite the first said angle to form a second bias ply on said belt and then wrapping said second ply about said first ply to form on the band building means a composite bias ply band.

4. Method as claimed in claim 2, and after wrapping one said ply band about said means and before wrapping a subsequent ply thereabout, moving said band building means longitudinally of its own rotational axis to provide an axial displacement or step-off of said subsequent ply band relative to said one band.

5. Method as claimed in claim 1, wherein said transferring of said ply from said belt to said band building means is assisted by a magnetic force.

6. Method as claimed in claim 5, and assisting said transferring by attaching manually at least one removable magnetic device to said band building means with a leading edge of said ply therebetween.

* * * * *